(12) United States Patent
Cantoral et al.

(10) Patent No.: US 6,192,412 B1
(45) Date of Patent: Feb. 20, 2001

(54) COMPUTER FILE TRANSMISSION SYSTEM AND METHOD

(75) Inventors: Eduardo Cantoral, Warrenville; Joseph F. Lennert, Bolingbrook; Steve A. Plovich, Naperville, all of IL (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/124,164

(22) Filed: Jul. 28, 1998

(51) Int. Cl.[7] .............................. G06F 15/16; H04J 3/16
(52) U.S. Cl. .................. 709/236; 709/246; 709/247; 370/472
(58) Field of Search ............................ 709/238, 232, 709/237, 236, 246–247, 230–231; 370/472

(56) References Cited

U.S. PATENT DOCUMENTS

| | | | |
|---|---|---|---|
| 4,691,314 | * 9/1987 | Bergins et al. ........................ 370/471 |
| 5,191,583 | * 3/1993 | Pearson et al. ...................... 370/242 |
| 5,579,239 | * 11/1996 | Freeman et al. ....................... 348/14 |
| 5,631,908 | * 5/1997 | Saxe ..................................... 370/235 |
| 5,684,716 | * 11/1997 | Freeman ............................... 345/328 |
| 5,721,907 | * 2/1998 | Pyne ....................................... 707/10 |
| 5,751,970 | * 5/1998 | Bournas ............................... 709/236 |
| 5,946,697 | * 8/1999 | Shen .................................... 707/104 |
| 6,018,780 | * 1/2000 | Fenchel ............................... 710/105 |
| 6,076,113 | * 6/2000 | Ramanathan et al. ................ 709/235 |
| 6,085,251 | * 7/2000 | Fabozzi, II .......................... 709/230 |

* cited by examiner

Primary Examiner—Zarni Maung
Assistant Examiner—Andrew Caldwell

(57) ABSTRACT

A system and method for transferring large computer files across computer networks that has a file splitter that separates a computer file into component sections, and a file transmitter that independently sends the component sections to a receiving computer by a recursive process that starts recursively splitting from a preselected maximum size for a component section and stops when the size of the smallest component section is equal to or less than a selected minimum size for a component section.

44 Claims, 9 Drawing Sheets

COMPUTER FILE TRANSMISSION SYSTEM AND METHOD

BACKGROUND OF THE INVENTION

The present invention relates generally to the field of computer communication systems and more particularly to computer file transfer systems.

The transfer of large computer files between different computers continues to grow worldwide at a rapid pace. Databases, video files, and other large computer files are used extensively on present computer networks. Disadvantageously, transferring these large files between different computer networks through existing computer file transfer systems require a large amount of time. The present inventors have determined that a very significant portion of the excessive time for successful transmission of these large files is due to the retransmission of the large files because initially or on subsequent attempts they are not received correctly at the intended recipient computer.

SUMMARY OF THE INVENTION

In accordance with the present invention, the problem of excessive file transfer times of known file transmitting systems, particularly with respect to very large files, is overcome by splitting the file into a plurality of component sections each of which is sent independently.

Preferably, a system of the invention includes a file splitter, for separating the computer file into component sections and a file transmitter for independently sending the component sections to the receiving computer. The file splitter includes a recursive splitter for splitting the computer file into smaller component sections from the larger component sections. The file splitter includes an initial file size selector for preselecting the maximum size for a component section and a threshold selector for stopping the recursive splitter when the size of the smallest component section is equal to or less than a minimum size for a component section.

The threshold selector preferably includes a variable selector for changing the maximum size of the component sections in accordance with a preselected environmental variable and means for determining the environmental variable.

A transmission controller at the transmitting computer independently controls transmission of each of the component sections of the file to the receiving computer includes a router for independently controlling the routing of the transmission of each of the component sections of the computer file. Additionally, the transmission controller includes a file compressor for independently controlling the compression of each of the component sections prior to transmission to the receiving computer.

Preferably, the transmission controller also includes a retransmitter for independently controlling the retransmission of each of the component sections in the event of transmission failure and means for concurrently transmitting each component section asynchronously relative to each other component section.

BRIEF DESCRIPTION OF THE DRAWINGS

The foregoing advantageous features of the invention will be described in detail and other advantageous features will be made apparent upon reading the following detailed description that is given with reference to the several figures of the drawings, in which.

DETAILED DESCRIPTION

Figure 1:
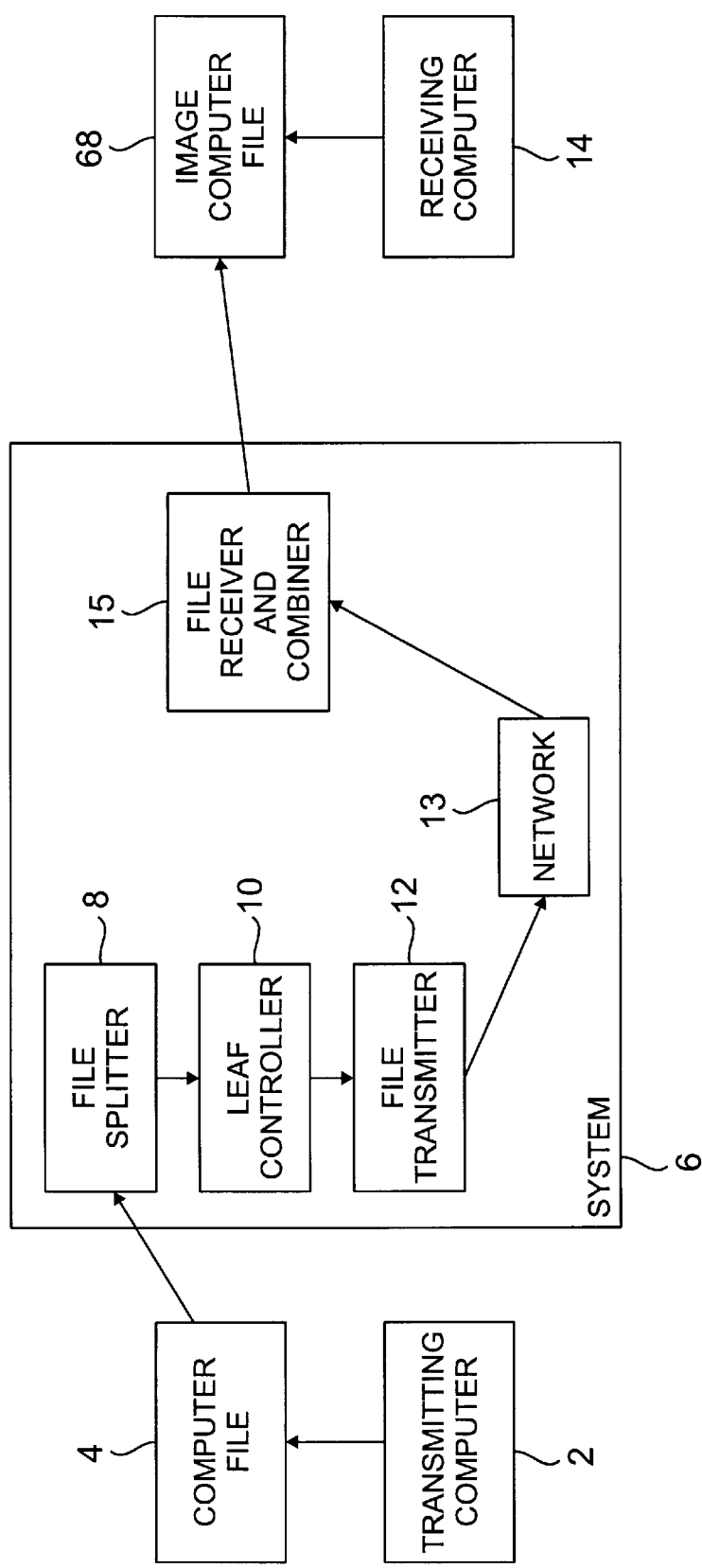
FIG. 1 is a functional block diagram of an embodiment of the system of the invention.

Referring to FIG. 1, a transmitting computer 2 sends a computer file 4 to the system 6. The system 6 processes the computer file 4 through a file splitter 8 and a leaf controller 10 and transmits the results through a file transmitter 12 and network 13. A file receiver and combiner 15 receives and recombines it to create an image computer file 68. The image computer file 68 is then sent to the receiving computer 14.

Figure 2:
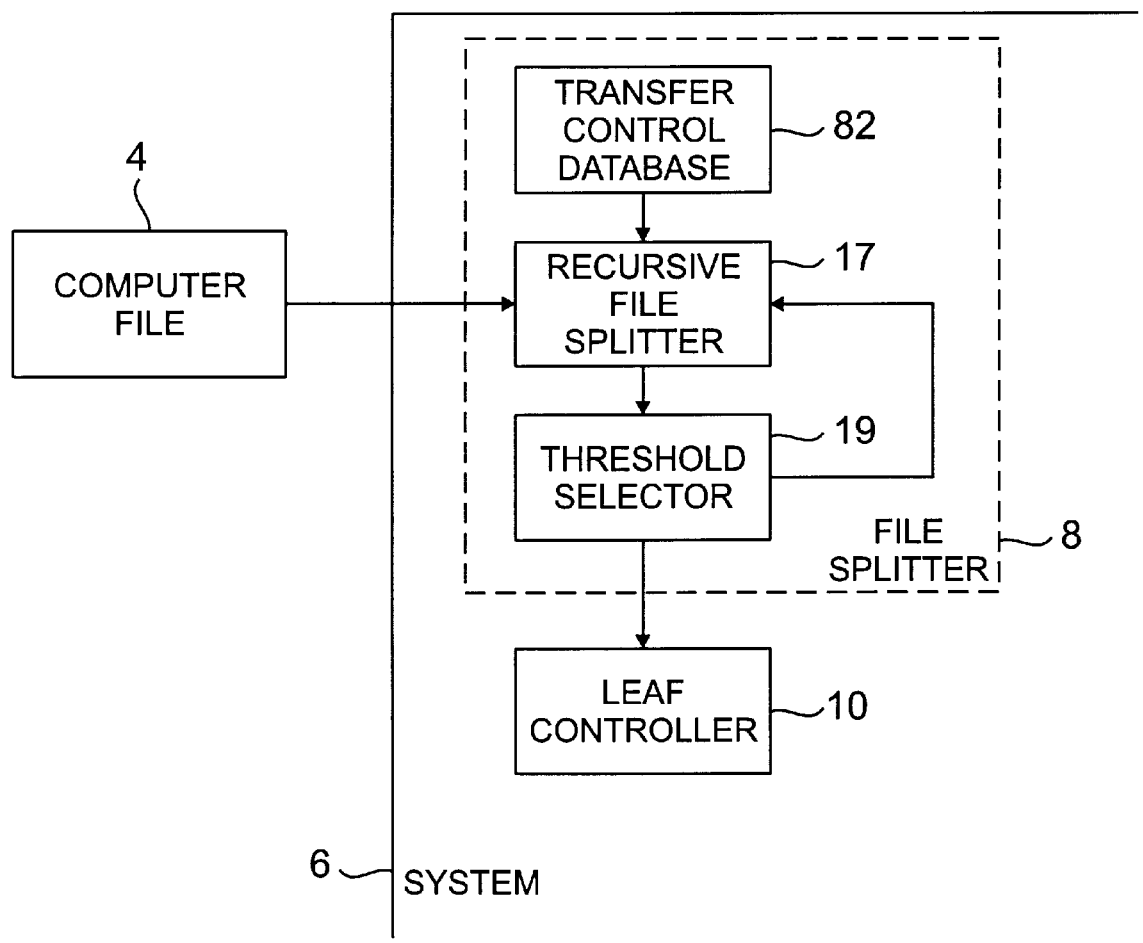
FIG. 2 is a functional block diagram showing the preferred form of the file splitter functional block in FIG. 1.
Figure 5:
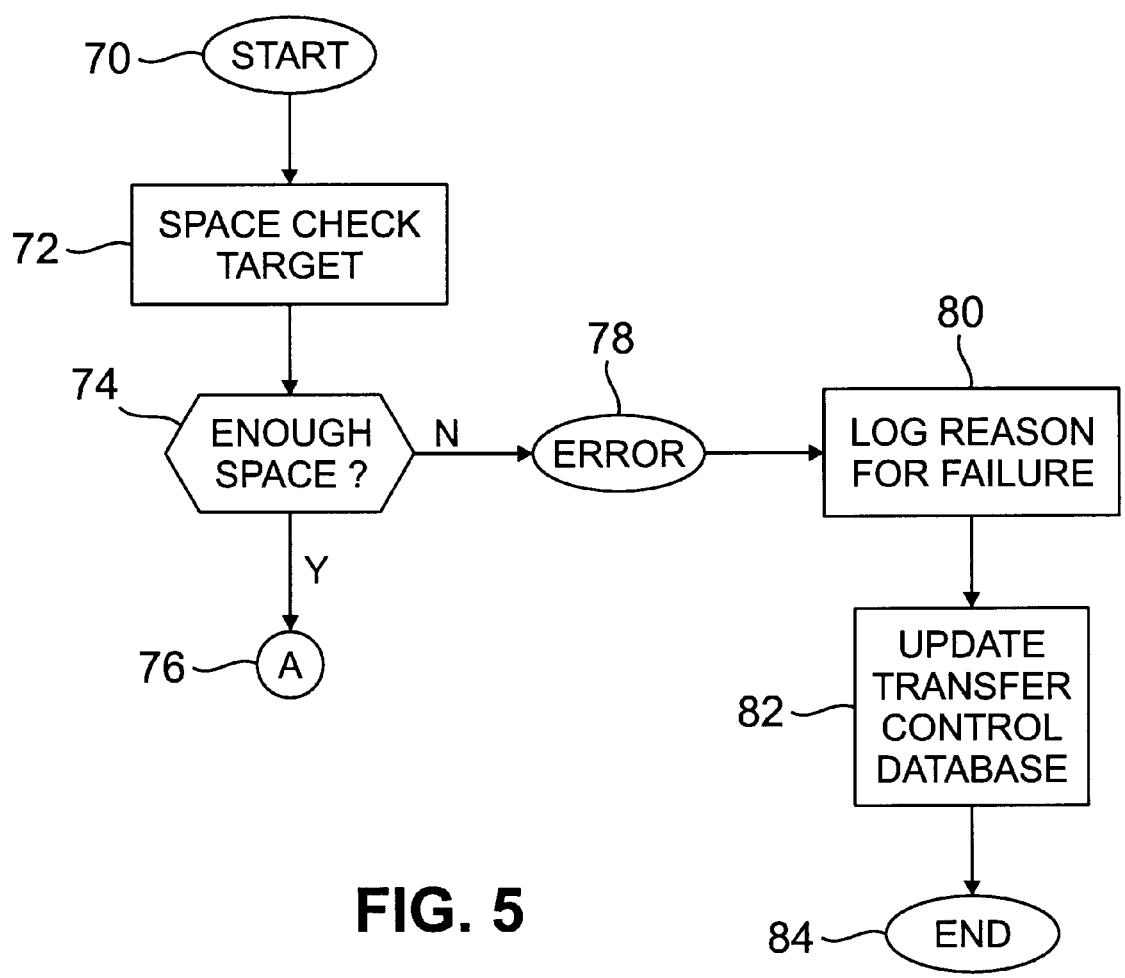
FIG. 5 is a portion of a composite logic flow chart, shown also in FIGS. 6, 7 and 8, of the process performed at the file transmitter of the system of FIGS. 1, 2, and 3 to obtain transfer heuristics of the system.

In FIG. 2, the system 6 file splitter 8 has a recursive file splitter 17, threshold selector 19, and a transfer control database 82 of FIG. 5. The computer file 4 inputs into the recursive file splitter 17. The transfer control database 82 provides the initial file size of a section to the recursive file splitter 17. The initial file size is based on previous transmissions. The recursive file splitter 17 passes the section of initial file size to the threshold selector 19. The threshold selector 19 determines whether the section size is acceptable for proper transmission. If the size is unacceptable the threshold selector 19 passes the section back to the recursive file splitter 17 which divides the section into subsections that are sent back to the threshold selector 19 which again determines whether the new section size is acceptable for proper transmission. If, instead, the size is acceptable the threshold selector 19 passes the subsection to the leaf controller 10.

The transfer control database 82, FIG. 5, is a log of results from previous transmissions and transmission attempts. This log includes the size of the computer file 4, the size of each component section, the number of component sections that compose the computer file 4, the interval times, the number of attempted retransmissions, the time of retransmission of each component section, routing path information for each component section, and any reasons for any failure in transmission of any component section. For purposes of example the transfer control database 82 is shown internal to the file splitter 17. The system 6 performs equally well if the transfer control database 82 is part of the system 6 but external to the file splitter 17.

Figure 2A:
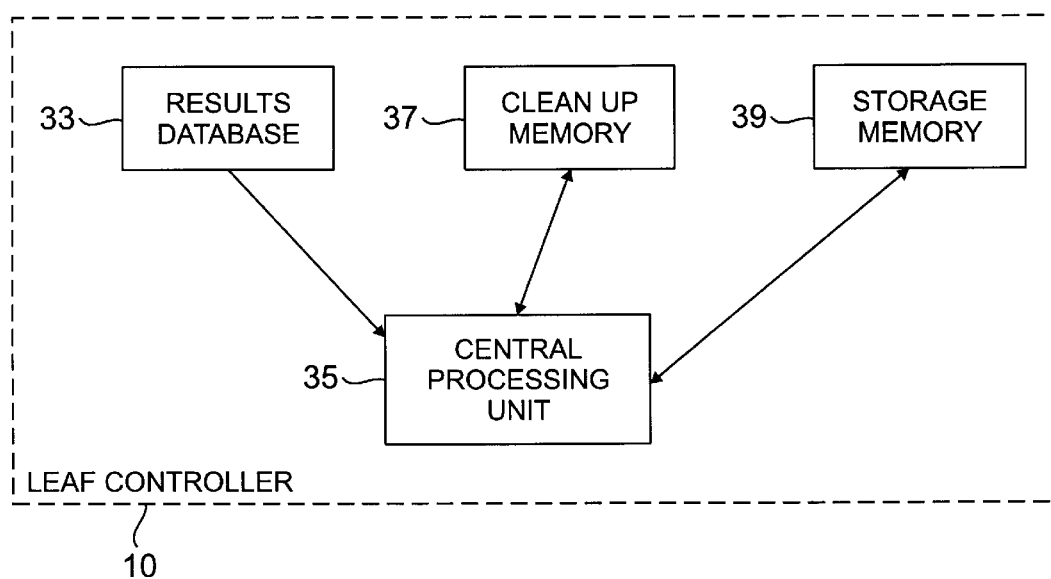
FIG. 2A is a functional block diagram showing the preferred form of the leaf controller functional block in FIG. 1.

In FIG. 2A, the leaf controller has four elements. A results database 33, a central processing unit 35, a clean up memory unit 37, and a storage memory unit 39. The results database 33 is the transfer control database 82 of FIG. 5. Here again, the actual location of the transfer control database 82 need not be located inside the leaf controller 10, but the information from the transfer control database 82 is available to the leaf controller 10.

The leaf controller 10 uses a central processing unit 35 to monitor the results of the file splitter 8 in FIG. 1 and the results database 33. The leaf controller 10 keeps track of this information in the clean up memory 37 until the computer file 4 of FIG. 1 has been successfully transmitted to the receiving computer 14. Once the transmission is successful the central processing unit 35 clears the clean up memory 37. Stored in storage memory 39 is software that controls the central processing unit 35 of the leaf controller 10 and performs the steps of the flow chart shown in FIG. 6.

Figure 3:
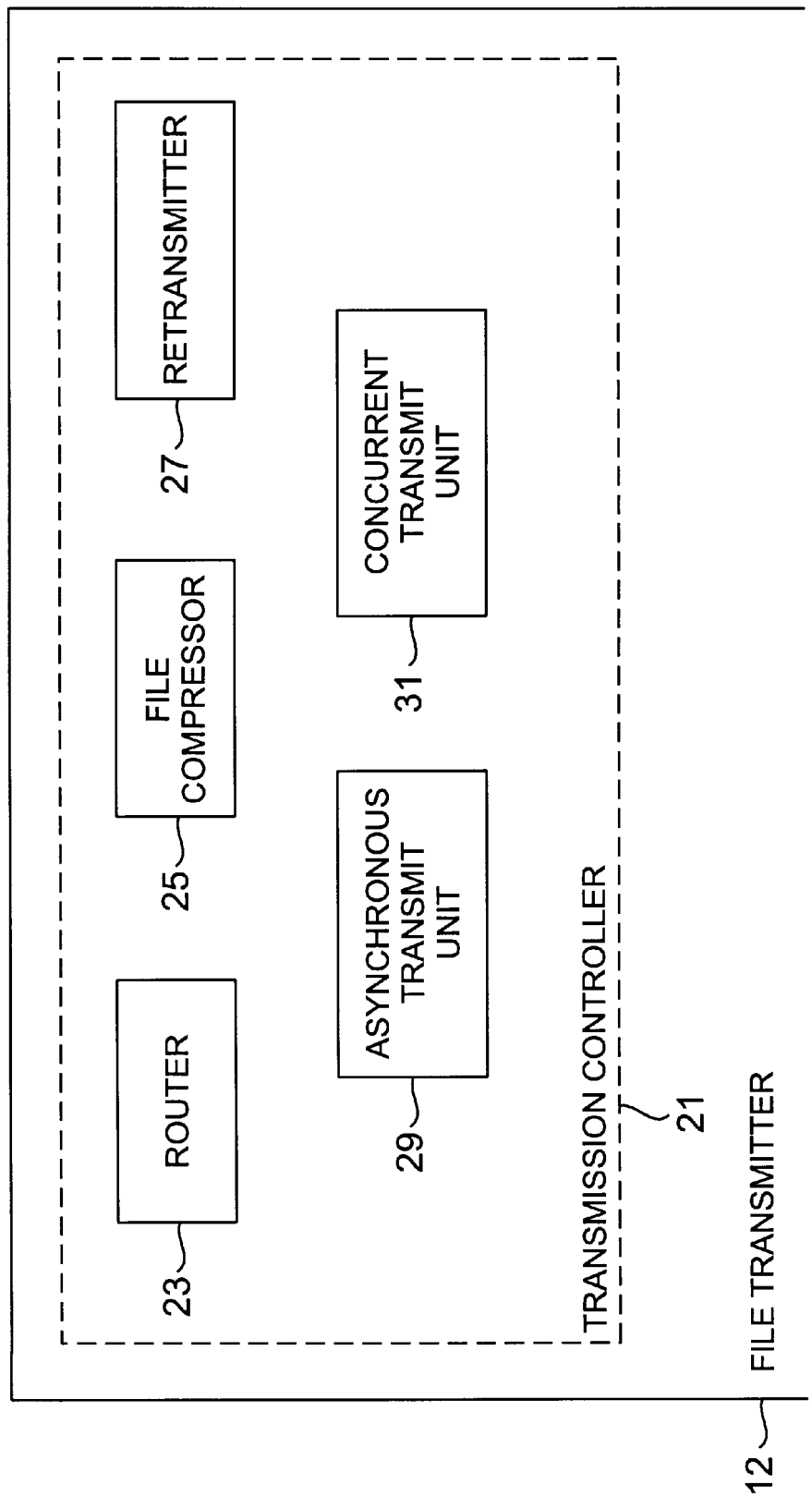
FIG. 3 is a functional block diagram showing the preferred form of the file transmitter functional block in FIG. 1.

Referring to FIG. 3, the file transmitter 12 of FIG. 1 is shown with a transmission controller 21. The transmission controller 21 has five elements whose functions will be described in FIGS. 6, 7, and 8. The file transmitter 12 includes a router 23, a file compressor 25, a retransmitter 27, an asynchronous transmit unit 29, and a concurrent transmit unit 31.

Figure 4:
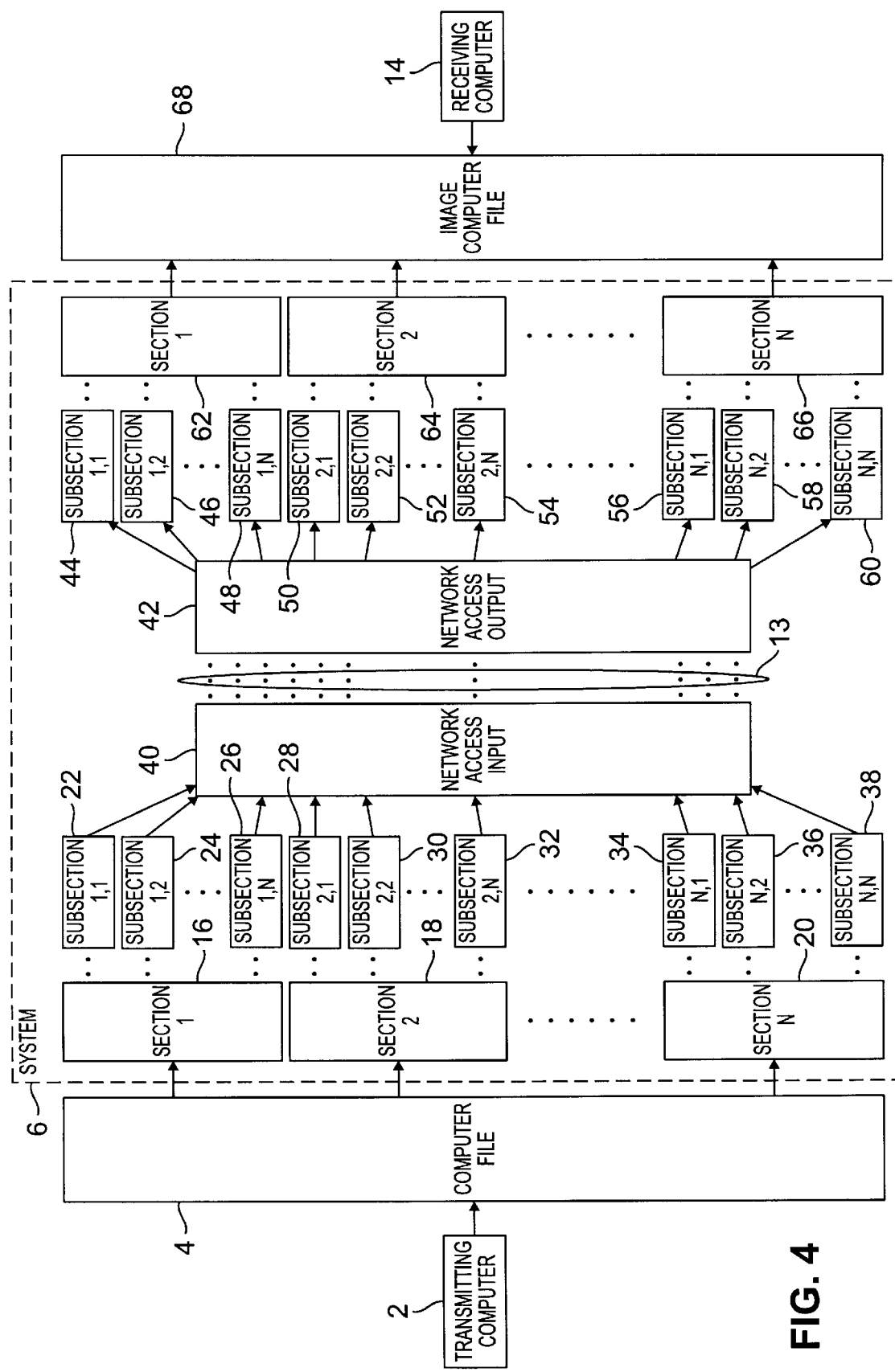
FIG. 4 is a schematic illustration of the recursive file splitting and file integrating functions respectively performed by the file splitter and the file transmitter of the system of the invention.

In FIG. 4, the system 6 is shown in detail. The computer file 4, having a size on the order of 0.5 gigabit and up, is input into the system 6 from the transmitting computer 2. The system 6 first splits the computer file 4, through the file splitter 8 of FIG. 1, into component sections shown as sections 16, 18, and 20 and, if needed, subsections 22, 24, 26, 28, 30, 32, 34, 36, and 38. The system 6 manages these sections and subsections in the leaf controller 10 of FIG. 1. If the size of the file permits, the system 6 transmits either the sections 16, 18, and 20. If the size of the file is larger then the system 6 creates and sends the subsections 22, 24, 26, 28, 30, 32, 34, 36, and 38. On the other hand, if only a limited number of the files are too large, then the system 6 creates and sends a combination of both sections and subsections through a network access input 40, network 13, and network access output 42. The leaf controller 10 manages these sections and subsections based on the recorded environmental conditions as recorded in the transfer control database 82 (shown in FIG. 5). The leaf controller 10 in one example uses multi-threaded state based entities.

These recorded environmental conditions give the file splitter 8 the optimal component section size that was successful that was used in a previous file transfer. Thus the environmental conditions select the maximum size for a component section. As such, the file splitter 8 initially sets the size of sections 16, 18, and 20 to the optimal size of the last file transfer. If the environmental conditions change and the sections do not transfer, the leaf controller 10 attempts to retransmit the individual sections that did not transfer correctly. If the transfer still fails, then after a given amount of retransmission attempts, the file splitter 8 begins a recursive process to find a smaller optimal size that transfers correctly. This recursive process is limited to the individual section or sections that did not transfer correctly.

Thus, as an example, if section 16 did not transfer correctly after a given number of retransmission attempts, the file splitter 8 recursively generates subsections 22, 24, and 26. The leaf controller 10 attempts to transmit the subsections 22, 24, and 26. If one of the subsections is transmitted correctly the file size of the transmitted subsection is selected as the minimum size (optimal size) for a component section and the recursive process stops when the subsections are of a size equal to or less than the optimal size. Once the new optimal size has been determined for the subsections 22, 24, and 26 to transfer correctly, the information is sent to the transfer control database 82 of FIG. 5. The system 6 then integrates the received sections and subsections to produce an image computer file 68 that is input to the receiving computer 14.

FIG. 4 only shows, for illustration purposes, a limited number of sections 16, 18, and 20 and subsections 22, 24, 26, 28, 30, 32, 34, 36, and 38. In the example given, subsections 22, 24, 26, 28, 30, 32, 34, 36, and 38 are leaf nodes because the subsections are shown in FIG. 4 to be the final component sections of the recursive process. Leaf nodes are end points that cannot be traversed. In this example, the subsections 22, 24, 26, 28, 30, 32, 34, 36, and 38 are leaf nodes.

Optimal file size is defined as the file size of the leaf node that has the highest probability of completing a transfer from the transmitting computer 2 to the receiving computer 14 based on the environmental conditions. The environmental conditions include machine(s), network, and transfer heuristics. The transfer heuristics consists of the transfer control database 82 (shown in FIG. 5) which contains the history information for the system 6. Thus, the recursive splitting process will produce a different number of leaf nodes for different environmental conditions.

Once the computer file 6 has been split into a given number of leaf nodes, the system 6 transmits the leaf nodes simultaneously through the network access input 40 to the network access output 42. The system 6 then produces the received subsections 44, 46, 48, 50, 52, 54, 56, 58, and 60. The system 6 compares all the received subsections 44, 46, 48, 50, 52, 54, 56, 58, and 60 against the subsections 22, 24, 26, 28, 30, 32, 34, 36, and 38 sent. If a received subsection does not match the corresponding sent subsection, the system 6 retransmits the subsection.

Once all the received subsections 44, 46, 48, 50, 52, 54, 56, 58, and 60 corresponding to the sent leaf nodes, the system 6 creates the image computer file 68. FIG. 4, for illustration purposes, only shows a limited number of subsections 44, 46, 48, 50, 52, 54, 56, 58, and 60. The actual number of subsections that are used is determined by the conditions existing at the time of transmission. The recursive splitting process of the computer file 6 produces the different number of sections and subsections for the different environment conditions.

FIG. 5 is a simple flow chart showing the steps in obtaining transfer heuristics of the system 6. The transfer heuristics consists of the transfer control database 82 that contains the transfer history of the system. Each sectional part transfer job collects system 6 status with respect to itself and updates the transfer control database 82. In this example, the transfer heuristics is checking for available space on the receiving computer 14 (referred to as the target). Other examples for the transfer heuristics are based on network and system performance such as elapsed time of sectional part transfer through the network, number of transmission retries, number of recursive transfer calls, number and path of transfer nodes used and final sectional part size successfully transferred.

Referring to FIG. 5, the system 6 starts at 70. In step 72, processing commences by checking space on the target. If there is enough space, in step 74 the process continues through junction 76 to step 86, FIG. 6. In step 86, the file splitter 8, as previously described in FIG. 2, splits very large files into N sections. If there is not enough space, decision step 74 triggers an error in step 78 and the process logs the reason for the failure in step 80, updates the transfer control database 82, and ends the process in step 84.

Figure 6:
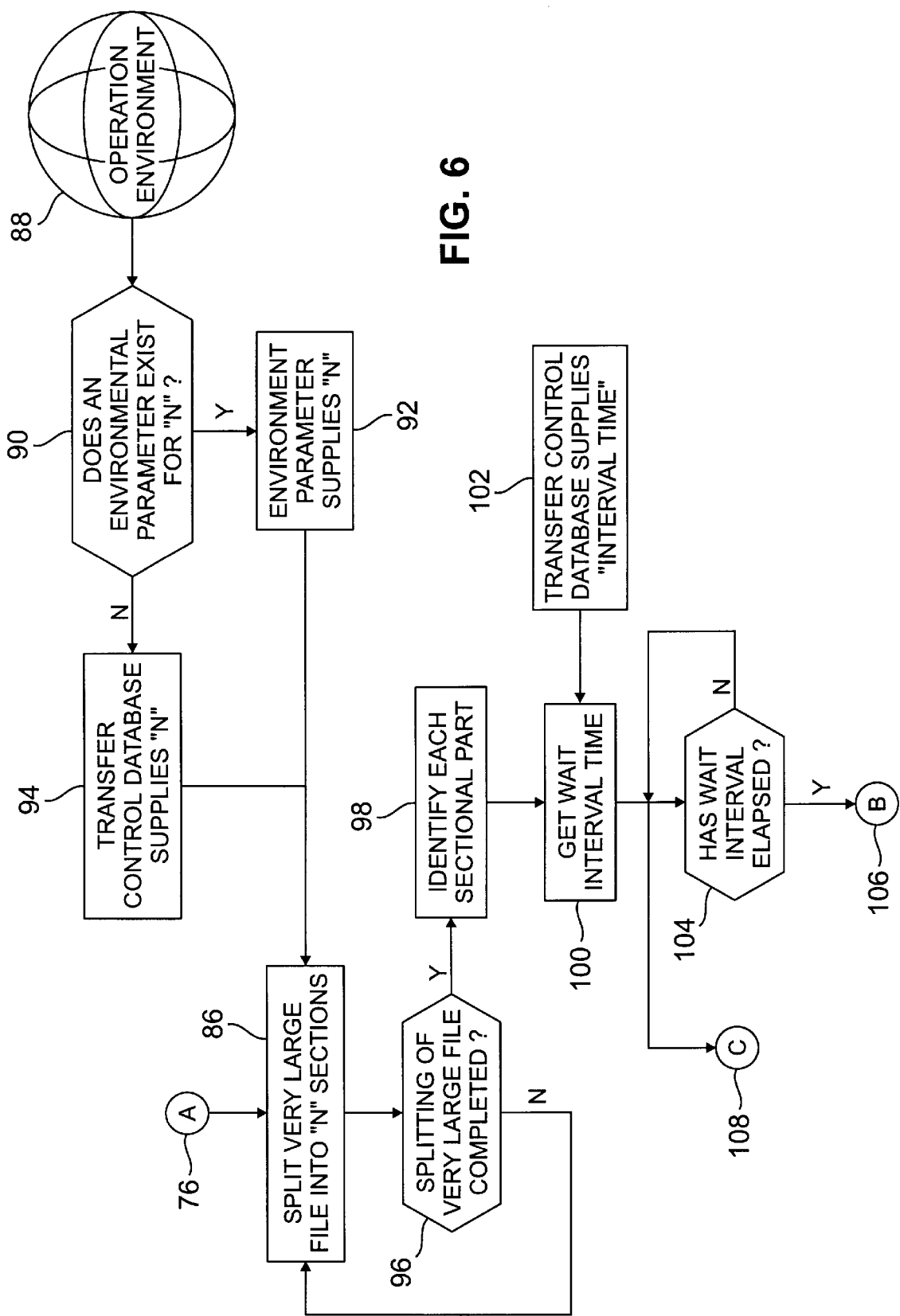
FIG. 6 is another portion of the composite logic flow chart that shows the preferred process performed by the recursive file splitter and the leaf controller of FIG. 1.

Referring to FIG. 6, the file splitter 8 splits the computer file 4 into N sections in step 86. The value of N is selectively determined by one of the operation environment 88 and the transfer control database 82 of FIG. 3.

The operational environment 88 is the information from a particular environment of interest such as a manual override of the transfer control database 82 of FIG. 5. If such information exits decision step 90 provides that environmental parameter to step 92 which produces a value on N based on the environmental parameter. If there is no environmental parameter, decision step 90 goes to step 94 which supplies a value for N based on the transfer control database 82 of FIG. 5. The value of N from either step 92 or step 94 is then sent to step 86.

The file splitter 8 splits the computer file 4 into N sections. After every split, the file splitter checks, in decision step 96, for process completion. If the process of splitting the computer file is not complete in step 96 the process returns to step 86, and the file splitter 8 continues to split the sections into new subsections. If the process of splitting is complete, in step 96 the resultant leaf nodes are sent to the leaf controller 10 of FIG. 1.

In step 98, the leaf controller 10 identifies each leaf node. The leaf controller 10 then gets the wait interval time, in step 100, from the transfer control database 82 in step 102.

After getting the wait interval time, the leaf controller 10 then sends the information to a watchdog process in step 108 that is described in FIG. 5. If the wait interval time has elapsed, decision step 104 sends the information to a file compressor 110 (shown in FIG. 5) in step 106. If the wait interval time has not elapsed, the decision step 104 checks again.

Figure 7:
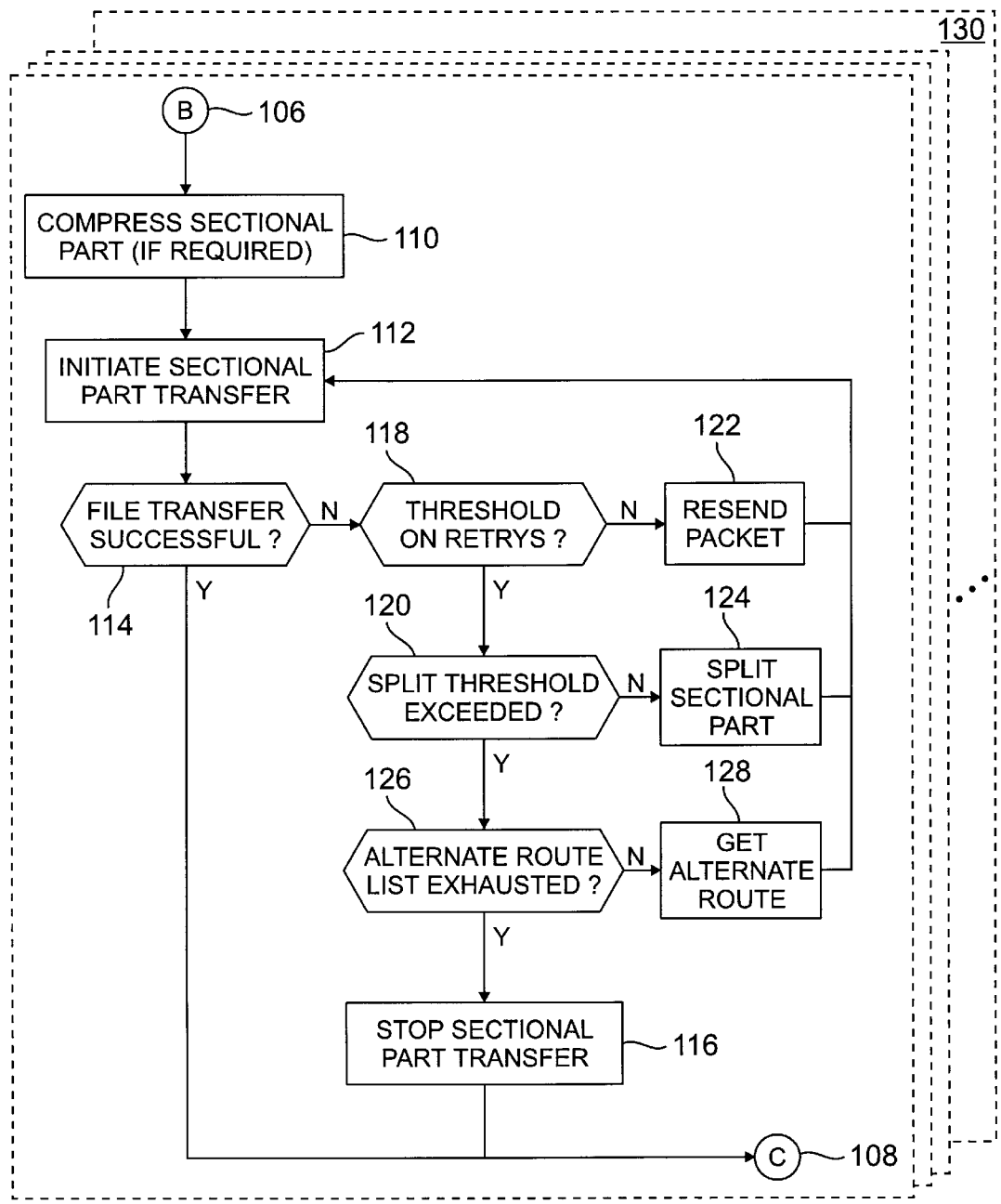
FIG. 7 is another portion of the composite logic flow chart that shows the preferred process for independent asynchronous packet transfer of the file sections to the receiving computer of FIG. 1.

FIG. 7 is a flow chart for the packet transfer of the sections. The doted lines 130 represent the individual sections shown in FIG. 2. If the wait interval time has elapsed in step 104 of FIG. 4, the packet transfer of the sections begins. If compression is needed, the sectional parts are compressed in step 10 before the initiation of the sectional part transfer in step 112.

Once the sectional part transfer has been initiated by step 112, decision step 114 tests to see if the file transfer was successful. If yes, the process is passed to the watchdog process in step 108. If no, decision step 118 tests whether the threshold on retries has been achieved. This threshold is determined by the needs of the system performance. If the result of decision step 118 is no, the process first decides to re-send the packet in step 122 and then initiates a recursive sectional part transfer in step 112.

If the result of decision step 118 is yes, the process next determines if the split threshold has been exceeded in decision step 120. If the result of decision step 120 is no, the process splits the sectional part in step 124 and initiates the sectional part transfer in step 112. If the result of decision step 120 is yes, the process determines if the alternative route list has been exhausted in decision step 126.

If the result of decision step 126 is no, the process gets on alternative route in step 128 and sends the sectional part in step 112. If the result of decision step 126 is yes, the section part transfer is stopped in step 116 and the process is sent to the watchdog process in step 108.

Figure 8:
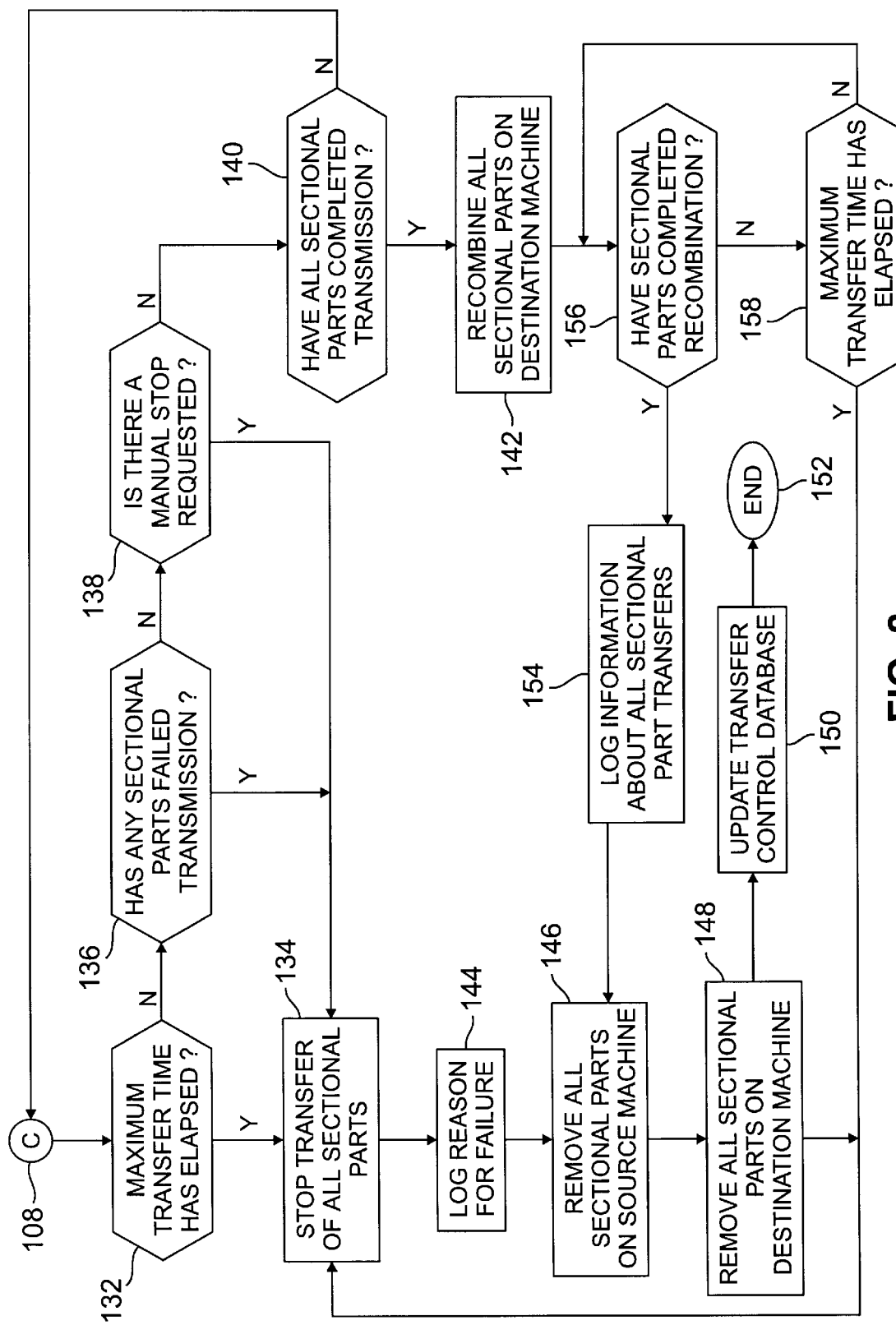
FIG. 8 is a another portion of the composite logic flow chart showing the preferred steps for a watchdog process and completion check.

FIG. 8 is a flow chart of the watchdog process and completion check. The watchdog process first checks, in decision step 132, whether the maximum transfer time has elapsed. If yes, step 134 stops the transfer of all the sectional parts. If no, process checks if any sectional parts have failed transmission in decision step 136. If yes, step 134 stops the transfer of all the sectional parts. If no, the process continues on check if there is a manual stop request in decision step 138. If yes, step 134 stops the transfer of all the sectional parts. If no, the process then checks if all the sectional parts have been transmitted in decision step 140. If no, the process loops back to decision step 132 and checks if the maximum transfer time has elapsed. If yes, the process recombines all the sectional parts on the destination machine (receiving computer 14 in FIG. 1) in step 142.

The process then checks to see if the sectional parts have completed recombination in decision step 156. If yes, the process transfers the log information about all the sectional part transfers to the receiving computer 14 in step 154. If no, the process checks if the maximum transfer time has elapsed in decision step 158. If no, the process again checks to see if the sectional parts have completed recombination in decision step 156. If yes, the process stops the transfer of all the sectional parts in step 134.

Once the process stops the transfer of all the sectional parts in step 134, the process: logs the reason for the failure in step 144; removes all the sectional parts on the source machine (the transmitting computer 2 in FIG. 1); removes all the sectional parts on the destination machine (receiving computer 14 in FIG. 1); updates the transfer control database 82 in step 150; and stops the process in step 152.

Additionally, after the log information about all the sectional parts is transferred to the receiving computer 14 in step 154, the process: removes all the sectional parts on the source machine (the transmitting computer 2 in FIG. 1); removes all the sectional parts on the destination machine (receiving computer 14 in FIG. 1); updates the transfer control database 82 in step 150; and stops the process in step 152.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope. The scope of the invention is indicated by the attached claims.

What is claimed is:

1. A system for transmitting a computer file from a transmitting computer to a receiving computer, the system comprising:

a file splitter at the transmitting computer that separates the computer file into component sections; and a file transmitter at the transmitting computer that independently sends the component sections to the receiving computer;

wherein the file splitter further comprises a recursive file splitter, wherein the recursive file splitter, upon detecting one or more transmission failures during transmission of a larger component section, recursively splits the larger component section into smaller component subsections for retransmission.

2. The system as recited in claim 1 wherein a leaf controller manages leaf subsections asynchronously.

3. The system as recited in claim 2 wherein the leaf controller uses multi-threaded state based entities.

4. The system as recited in claim 1 wherein the file splitter includes a recursive splitter that splits the computer file into section, subsection, and leaf nodal subsections recursively.

5. The system as recited in claim 1 wherein the recursive splitter includes:
   an initial file size selector that selects an initial size for a component section; and
   a threshold selector that starts the recursive splitter to create a plurality of subsections if the file transmitter fails to transmit a component section that comprises the initial size and that stops the recursive splitter when a subsection of the plurality of subsections comprises a size that is less than or equal to a threshold size.

6. The system as recited in claim 1 further comprising means for determining a value of a preselected environmental variable, and wherein the threshold selector includes a variable s elector that changes the in, size of the component section in accordance with the value of the preselected environmental variable.

7. The system as recited in claim 6 wherein the transmission controller includes a router that independently controls transmission of each of the component sections to the receiving computer.

8. The system as recited in claim 6 wherein the transmission controller includes a file compressor that independently controls compression of each of the component sections prior to transmission thereof to the receiving computer.

9. The system as recited in claim 6 wherein the transmission controller includes a retransmitter that independently controls retransmission of each of the component sections upon transmission failure.

10. The system as recited in claim 6 wherein the transmission controller includes means for transmitting the component sections asynchronously.

11. The system as recited in claim 6 wherein the transmission controller includes means for transmitting the component sections concurrently.

12. The system as recited in claim 1 wherein the file transmitter includes a transmission controller that independently controls transmission of each of the component sections to the receiving computer.

13. A system for transmitting a computer file from a transmitting computer to a receiving computer, the system comprising:
   means at the transmitting computer for separating the computer file into component sections;
   means at the transmitting computer for independently sending the component sections to the receiving computers;
   wherein the means for separating further comprises a means for recursively splitting, wherein the means for recursively splitting, upon detecting one or more transmission failures during transmission of a larger component section, recursively splits the larger component section into smaller component subsections for retransmission.

14. The system of claim 13 in which the means for recursively splitting includes:
   means for establishing an initial size for a component section of the component sections, and
   means for recursively splitting the component section into smaller component sections, until a smaller component section of the smaller component sections comprises a size that is equal to or less than a threshold size, upon a failure to transmit the component section that comprises the initial size.

15. The system of claim 14 further comprising means for determining a value of a preselected environmental variable, and wherein the means for establishing includes means for selectively changing a preselected size of the component sections in accordance with the value of the preselected environmental variable.

16. The system of claim 13 in which the independently sending means includes a transmission controller at the transmitting computer for independently controlling transmission of each of the component sections to the receiving computer.

17. The system of claim 16 in which the transmission controller includes means for independently controlling routing of transmission of each of the component sections.

18. The system of claim 16 in which the transmission controller includes means for independently controlling compression of each of the component sections prior to transmission thereof to the receiving computer.

19. The system of claim 16 in which the transmission controller includes means for independently controlling retransmission of each of the component sections upon transmission failure.

20. The system of claim 16 in which the transmission controller includes means for transmitting the component sections asynchronously.

21. The system of claim 16 in which the transmission controller includes means for transmitting the component sections concurrently.

22. The system of claim 13 in which the sending means includes
   means for determining whether a component section has been successfully transmitted, and
   means responsive to the determining means for transmitting each of the component sections until the first to occur of
   the component section being successfully received by the receiving computer, and
   a preselected maximum number of unsuccessful retransmissions being attempted.

23. The system of claim 22 in which the sending means includes means responsive to a selected maximum number of unsuccessful attempts of retransmission via one route for retransmitting the component section via at least one alternative route.

24. The system of claim 13 in which the sending means includes means for determining whether a component section transmitted via one route has been successfully received by the receiving computer, and
   means responsive to the determining means for retransmitting the component section via an alternative route if transmission via the one route has been unsuccessful.

25. The system of claim 13 in which the sending means includes means for terminating transmission of all the component sections in response to at least one of:
   unsuccessful transmission of any one of the component sections,
   exceeding of a preselected maximum transmission time for successful transmission of every one of the component sections, and
   receipt of a transmission termination request.

26. The system of claim 13 further comprising means for logging results of a plurality of unsuccessful transmission attempts.

27. The system of claim 26 in which the results logging means logs data concerning transmission of at least:
   size of the file,
   size of each of the component sections,
   a count of the component sections,
   interval times,
   number of attempted retransmissions,
   time of retransmission for the component sections,
   routing path for each of the component sections, and
   reason for any failure in transmission of the component sections.

28. The system of claim 13 further comprising means for performing a number of clean-up functions after conclusion of an attempted sending of all the component sections.

29. The system of claim 13 further comprising
   means at the receiving computer for receiving the component sections from the transmitting computer; and
   means at the receiving computer for combining the component sections received at the receiving computer into a composite received file that comprises a substantial duplicate of the computer file transmitted from the transmitting computer.

30. A method for transmitting a computer file from a transmitting computer to a receiving computer comprising the steps of:
   at the transmitting computer, separating the computer file into component sections; and
   at the transmitting computer, independently sending the component sections to the receiving computers;
   upon detecting one or more transmission failures during transmission of a larger component section, recursivly splitting the larger component section into smaller component subsections for retransmission.

31. The method of claim 30 in which the step of independently sending includes the step of, at the transmitting computer, independently controlling transmission of each of the component sections to the receiving computer.

32. The method of claim 31 in which the step of controlling transmission includes the step of independently controlling retransmission of each of the component sections upon a failure in transmission thereof.

33. The method of claim 31 in which the step of controlling transmission includes the step of transmitting the component sections asynchronously.

34. The method of claim 31 in which the step of controlling transmission includes the step of transmitting the component sections concurrently.

35. The method of claim 31 in which the step of controlling transmission includes the step of independently controlling routing of transmission of each of the component sections.

36. The method of claim 35 in which the step of controlling transmission includes the step of independently controlling compression of each of the component sections prior to transmission thereof to the receiving computer.

37. The method of claim 30 in which the step of sending includes the steps of:
   determining whether a component sections has been successfully transmitted, and responding to a determination of an unsuccessful transmission result by retransmitting each of
   the component sections until the first to occur of the component section being successfully received
   by the receiving computer, and a preselected maximum number of unsuccessful retransmissions being attempted.

38. The method of claim 37 in which the step of sending includes the step of responding to a selected maximum number of unsuccessful attempts of retransmission via one route by retransmitting the component section via at least one alternative route.

39. The method of claim 30 in which the step of sending includes the steps of
   determining whether a component section transmitted via one route has been successfully received by the receiving computer, and
   responding to a determination that transmission via the one route has been unsuccessful by retransmitting the component section via an alternative route.

40. The method of claim 30 including the step of terminating transmission of all the component sections in response to at least one of:
   unsuccessful transmission of any one of the component sections,
   exceeding of a preselected maximum transmission time for successful transmission of every one of the component sections, and receipt of a transmission termination request.

41. The method of claim 30 including the step of logging results of at least one unsuccessful transmission of the component sections.

42. The method of claim 41 in which the results include data concerning transmission of at least:
   size of the file,
   size of each of the component sections,
   a count of the component sections,
   interval times,
   number of attempted retransmissions,
   time of retransmission for the component sections,
   routing path for each of the component sections, and
   reason for any failure in transmission of the component sections.

43. The method of claim 30 including the step of performing a clean-up function after conclusion of an attempted sending of all the component sections.

44. The method of claim 30 including the steps of
   at the receiving computer receiving the component sections from the transmitting computer, and
   at the receiving computer combining the component sections received at the receiving computer into a composite received file that comprises a substantial duplicate of the computer file transmitted from the transmitting computer.

* * * * *